United States Patent
Lee et al.

(10) Patent No.: US 12,200,338 B2
(45) Date of Patent: Jan. 14, 2025

(54) LENS AND LENS ASSEMBLY INCLUDING THE SAME

(71) Applicant: SAMSUNG ELECTRO-MECHANICS CO., LTD., Suwon-si (KR)

(72) Inventors: Jong Gi Lee, Suwon-si (KR); Dong Shin Yang, Suwon-si (KR); Kyung Ho Baek, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 124 days.

(21) Appl. No.: 18/308,025

(22) Filed: Apr. 27, 2023

(65) Prior Publication Data

US 2024/0205528 A1   Jun. 20, 2024

(30) Foreign Application Priority Data

Dec. 14, 2022   (KR) .................. 10-2022-0175005

(51) Int. Cl.
| | |
|---|---|
| *H04N 23/55* | (2023.01) |
| *G02B 3/02* | (2006.01) |
| *H04N 23/57* | (2023.01) |

(52) U.S. Cl.
CPC .............. *H04N 23/55* (2023.01); *G02B 3/02* (2013.01); *H04N 23/57* (2023.01)

(58) Field of Classification Search
CPC .......... H04N 23/55; H04N 23/57; G02B 3/02; G03B 30/00
See application file for complete search history.

(56) References Cited

U.S. PATENT DOCUMENTS

| | | | |
|---|---|---|---|
| 9,952,359 B2 | 4/2018 | Chang | |
| 12,107,103 B2* | 10/2024 | Yoshioka | .......... H01L 27/14636 |
| 2019/0064399 A1 | 2/2019 | Wang et al. | |
| 2021/0191002 A1 | 6/2021 | Choi et al. | |
| 2022/0392937 A1* | 12/2022 | Yoshioka | ................ G02B 3/02 |

FOREIGN PATENT DOCUMENTS

| | | |
|---|---|---|
| KR | 10-2287990 B1 | 8/2021 |
| KR | 10-2292096 B1 | 8/2021 |

* cited by examiner

*Primary Examiner* — Nicholas G Giles
(74) *Attorney, Agent, or Firm* — NSIP Law

(57) ABSTRACT

A lens includes an optical portion and a flange portion. The optical portion has a greater length along a first axis direction than a second axis direction, and the first axis direction and the second axis direction are perpendicular to an optical axis and perpendicular to each other. A flange portion extending along the first axis direction includes a first inclined portion connected to a first surface of the optical portion and a second inclined portion connected to a second surface of the optical portion. The second inclined portion protrudes in an optical axis direction, relative to the second surface of the optical portion, in an area in which the second inclined portion is connected to the second surface of the optical portion. A light absorption layer is disposed in the area in which the second inclined portion is connected to the second surface of the optical portion.

16 Claims, 5 Drawing Sheets

B

C

LENS AND LENS ASSEMBLY INCLUDING THE SAME

CROSS-REFERENCE TO RELATED APPLICATION(S)

This application claims the benefit under 35 USC 119(a) of Korean Patent Application No. 10-2022-0175005 filed on Dec. 14, 2022 in the Korean Intellectual Property Office, the entire disclosure of which is incorporated herein by reference for all purposes.

BACKGROUND

1. Field

The following description relates to a lens and a lens assembly including the same.

2. Description of Background

Camera modules have commonly been used in portable electronic devices, such as smartphones, and recently, in accordance with the demand for miniaturization of portable electronic devices, camera modules mounted on portable electronic devices have also been required to be miniaturized.

In order to miniaturize camera modules, the size of a lens, a component of camera modules, may be reduced.

In general, since the lens has a circular shape and an image sensor has a rectangular shape, a partial amount of the light passing through the circular lens is not received by an imaging surface of the image sensor.

Therefore, by removing a portion of the circular lens, the size of the lens may be reduced without adversely affecting image quality.

However, a reduction in the length of the lens in one direction, perpendicular to an optical axis may cause a flare phenomenon due to diffuse reflection of light.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a lens includes an optical portion configured to refract light and a flange portion extending from the optical portion. The optical portion has a greater length along a first axis direction than a second axis direction, and the first axis direction and the second axis direction are perpendicular to an optical axis and perpendicular to each other. A flange portion extending along the first axis direction includes a first inclined portion connected to a first surface of the optical portion and a second inclined portion connected to a second surface of the optical portion. The second inclined portion protrudes in an optical axis direction, relative to the second surface of the optical portion, in an area in which the second inclined portion is connected to the second surface of the optical portion. A light absorption layer is disposed in the area in which the second inclined portion is connected to the second surface of the optical portion.

The first surface of the optical portion may be an object-side surface, and the second surface of the optical portion may be an image-side surface.

The light absorption layer may extend from an edge of the second surface of the optical portion to the second inclined portion.

The light absorption layer may be black.

The first inclined portion may include a first curved portion adjacent to the first surface of the optical portion and a first flat portion extending from the first curved portion and inclined with respect to the optical axis, and a first parting line may be formed between the first curved portion and the first surface of the optical portion.

The first parting line may have a surface facing the second axis direction or an inclined surface with respect to the optical axis.

The second inclined portion may include a second curved portion adjacent to the second surface of the optical portion and a second flat portion extending from the second curved portion and inclined with respect to the optical axis, and a second parting line may be formed between the second curved portion and the second surface of the optical portion.

The second parting line may have a surface facing the second axis direction or an inclined surface with respect to the optical axis.

The second inclined portion may include a third flat portion disposed between the second curved portion and the second surface of the optical portion.

The light absorption layer may be disposed at an edge of the second surface of the optical portion, the second parting line, and the second curved portion.

A concavo-convex portion may be disposed at each of an edge of the second surface of the optical portion, the second parting line, and the second curved portion.

The first inclined portion may include a first flat portion inclined with respect to the optical axis, the second inclined portion may include a second flat portion inclined with respect to the optical axis, and a third parting line may be formed in an area in which the first flat portion and the second flat portion are connected to each other.

The third parting line may have a surface facing the optical axis direction.

In another general aspect, a lens assembly includes a lens including an optical portion configured to refract light and a flange portion extending from the optical portion, wherein the lens has a greater length along a first axis direction that a second axis direction, the first axis direction and the second axis direction being perpendicular to an optical axis and perpendicular to each other; and a lens barrel accommodating the lens. The flange portion includes a first flange portion and a second flange portion facing each other in the first axis direction and a third flange portion and a fourth flange portion facing each other in the second axis direction. The first flange portion and the second flange portion are in contact with and coupled to the lens barrel. The third flange portion and the fourth flange portion are spaced apart from the lens barrel. The third flange portion and the fourth flange portion each include a first inclined portion connected to an object-side surface of the optical portion and a second inclined portion connected to an image-side surface of the optical portion. A parting line is disposed in an area in which the image-side surface of the optical portion is connected to the second inclined portion and protrudes in an optical axis direction, relative to the image-side surface of the optical portion, and a light absorption layer is disposed in the parting line.

A second parting line having a surface facing the second axis direction may be disposed in an area in which the object-side surface of the optical portion is connected to the first inclined portion.

A second parting line having a surface facing the optical axis direction may be disposed in an area in which the first inclined portion is connected to the second inclined portion.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
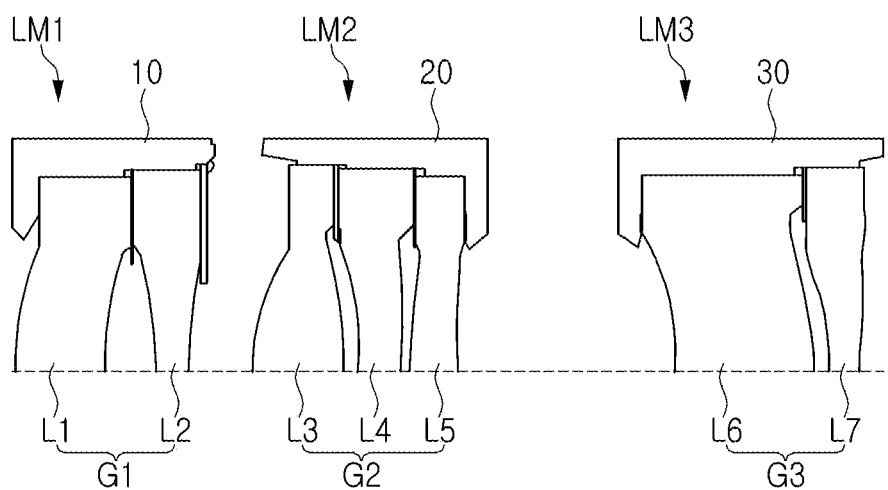
FIG. 1 is a schematic cross-sectional view of a lens assembly according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "May" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" May be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" May be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a schematic cross-sectional view of a lens assembly according to an example.

Referring to FIG. 1, a first lens module LM1 includes a first lens barrel 10 and a first lens group G1 accommodated in the first lens barrel 10. The first lens group G1 may include two lenses.

Among the two lenses of the first lens group G1, a front lens (hereinafter, referred to as a first lens L1) has positive refractive power and a rear lens (hereinafter, referred to as a second lens L2) has negative refractive power. The first lens group G1 may be configured to have negative refractive power as a whole.

A second lens module LM2 includes a second lens barrel 20 and a second lens group G2 accommodated in the second lens barrel 20. The second lens group G2 may include three lenses.

Among the three lenses of the second lens group G2, the frontmost lens (hereinafter, referred to as a third lens L3) has positive refractive power, and the middle lens (hereinafter, referred to as a fourth lens L4) has negative refractive power, and the rearmost lens (hereinafter, referred to as a fifth lens L5) has positive refractive power. The second lens group G2 may be configured to have positive refractive power as a whole.

A third lens module LM3 includes a third lens barrel 30 and a third lens group G3 accommodated in the third lens barrel 30. The third lens group G3 may include two lenses.

Among the two lenses of the third lens group G3, a front lens (hereinafter, referred to as a sixth lens L6) has positive refractive power and a rear lens (hereinafter, referred to as a seventh lens L7) has negative refractive power. The third lens group G3 may be configured to have negative refractive power as a whole.

Figure 2:
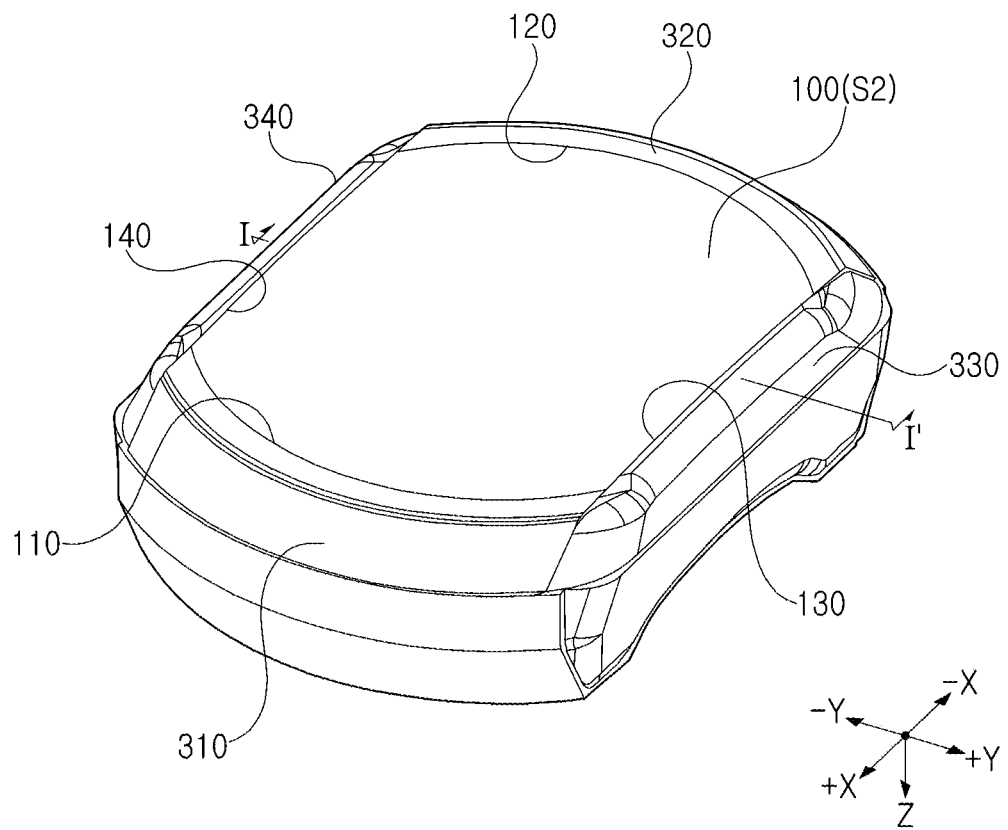
FIG. 2 is a perspective view of a lens according to an example.
Figure 3:
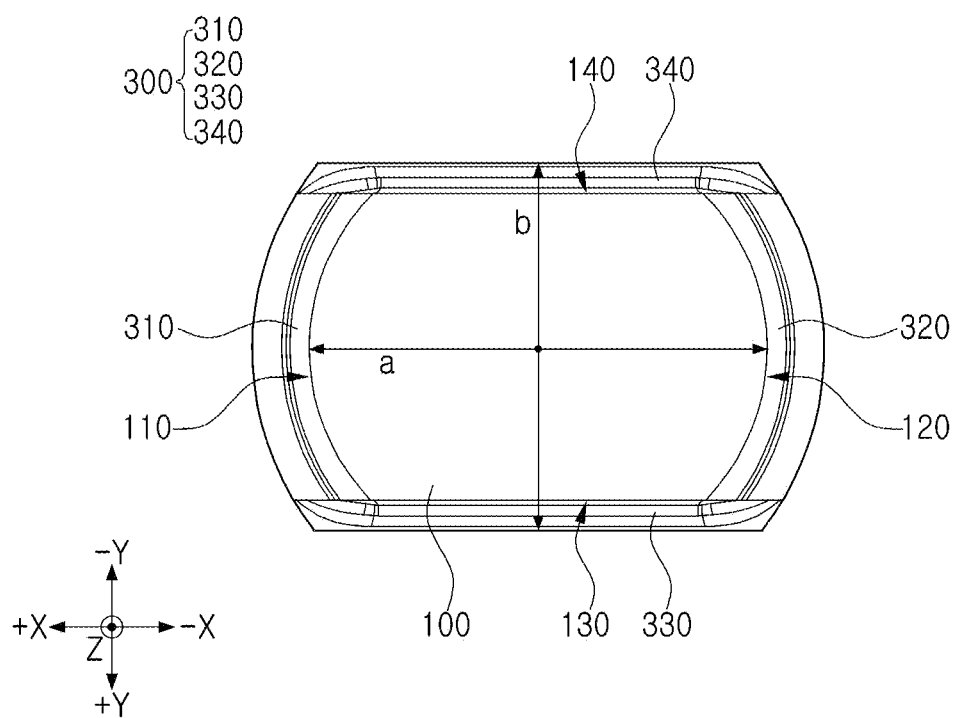
FIG. 3 is a plan view of a lens according to an example.
Figure 4:
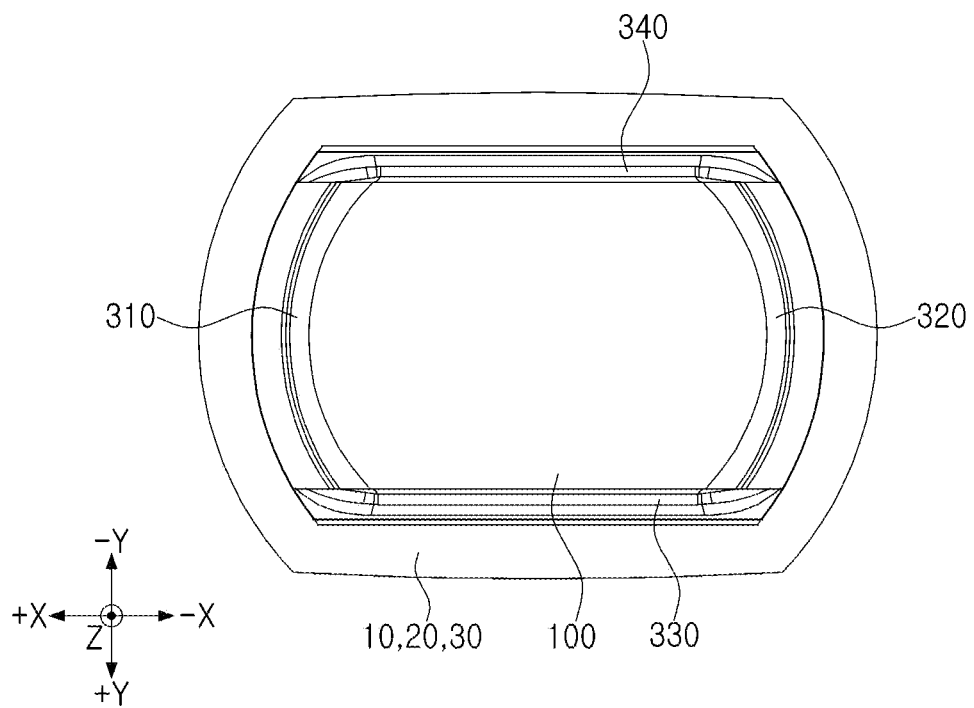
FIG. 4 is a plan view illustrating a state in which a lens is coupled to a lens barrel according to an example.

FIG. 2 is a perspective view of a lens according to an example, FIG. 3 is a plan view of a lens according to an example, and FIG. 4 is a plan view illustrating a state in which a lens is coupled to a lens barrel according to an example.

Referring to FIGS. 2 to 4, all of the first lens L1 to the seventh lens L7 have a non-circular planar shape. For example, each lens is configured such that a length in a first axis (an X-axis) direction, perpendicular to an optical axis (a Z-axis), is greater than a length in a second axis (a Y-axis) direction, perpendicular to both the optical axis (the Z-axis) and the first axis (the X-axis).

When viewed in the direction of the optical axis (the Z-axis), side surfaces of the respective lenses facing in the direction of the first axis (the X-axis) have an arc shape based on the optical axis (the Z-axis). For example, when a side surface facing in a positive direction of the first axis (the X-axis) is referred to as a first side surface, and a side surface facing in a negative direction of the first axis (the X-axis) is referred to as a second side surface, the first side surface and the second side surface have an arc shape based on the optical axis (the Z-axis).

In addition, side surfaces facing in the second axis (the Y-axis) direction connect the first side surface and the second side surface and have a substantially straight line shape when viewed from the optical axis (the Z-axis) direction. For example, when a side surface facing in a positive direction of the second axis (the Y-axis) is referred to as a third side surface, and a side surface facing in a negative direction of the second axis (the Y-axis) is referred to as a fourth side surface, each of the third and fourth side surfaces has a straight line shape parallel to the first axis (the X-axis) direction.

The first side surface and the second side surface are located on opposite sides to each other based on the optical axis (the Z-axis), the third and fourth side surfaces are located on opposite sides to each other based on the optical axis (the Z-axis), and the third side surface and the fourth side surface connect the first side surface and the second side surface, respectively.

Each lens has the first axis (the X-axis) and the second axis (the Y-axis) intersecting the optical axis (the Z-axis). For example, the first axis (the X-axis) may be an axis connecting the first side surface and the second side surface while passing through the optical axis (the Z-axis), and the second axis (the Y-axis) may be an axis connecting the third side surface and the fourth side surface, while passing through the optical axis (the Z-axis). The first axis (the X-axis) and the second axis (the Y-axis) are perpendicular to each other, and a length of the first axis (the X-axis) is longer than that of the second axis (the Y-axis).

For example, in each lens, a length of any one of two axes, intersecting the optical axis (the Z-axis) and being perpendicular to each other, is greater than that of the other axis.

Each lens is formed of a plastic material and is injection-molded through a mold. In the present example, each lens is formed through injection molding such that the length thereof in the second axis (the Y-axis) direction is shorter than the length thereof in the first axis (the X-axis) direction. That is, it is not that a portion of the circular lens is removed after the lens is manufactured through injection molding, but that the lens is manufactured to have such a shape during injection-molding.

Compared to a general lens having a circular shape, an image sensor has a rectangular shape. That is, since not every portion of light passing through the circular lens is used to form an image, an unnecessary portion of the circular lens may be removed to reduce the size of the lens without affecting image quality.

Each of the first lens L1 to the seventh lens L7 includes an optical portion 100 and a flange portion 300.

The optical portion 100 may be a portion exhibiting optical performance of the lens. For example, light reflected from a subject may pass through the optical portion 100 and be refracted.

The optical portion 100 may have refractive power and may have an aspherical shape.

The optical portion 100 may include an object-side surface (S1, a surface facing an object side) and an image-side surface (S2, a surface facing an image side).

The optical portion 100 includes a first edge 110, a second edge 120, a third edge 130 and a fourth edge 140. The first edge 110 and the second edge 120 are located to face each other, and the third edge 130 and the fourth edge 140 are located to face each other.

The third edge 130 and the fourth edge 140 connect the first edge 110 and the second edge 120, respectively.

The first edge 110 and the second edge 120 are located on opposite sides with respect to the optical axis (the Z-axis), and the third edge 130 and the fourth edge 140 are located on opposite sides with respect to the optical axis (the Z-axis).

When viewed in the optical axis (the Z-axis) direction, the first edge 110 and the second edge 120 have an arc shape, and the third edge 130 and the fourth edge 140 have a substantially straight line shape. The third edge 130 and the fourth edge 140 are symmetrical, based on the optical axis (the Z-axis), and may be formed to be parallel to each other.

The shortest distance between the first edge 110 and the second edge 120 is greater than the shortest distance between the third edge 130 and the fourth edge 140.

The optical portion 100 has a major axis a and a minor axis b. For example, when viewed in the direction of the optical axis (the Z-axis), a line segment connecting the third edge 130 and the fourth edge 140 with the shortest distance, while passing through the optical axis (the Z-axis), is the minor axis b, and a line segment connecting the first edge 110 and the second edge 120, while passing through the optical axis (the Z-axis), is the major axis a.

Here, half of the major axis a is a maximum effective radius, and half of the minor axis b is a minimum effective radius.

The flange portion 300 may be a portion fixing the lens to another component, for example, a lens barrel or another lens.

The flange portion 300 extends from the optical portion 100 and may be integrally formed with the optical portion 100.

Shapes of the optical portions 100 of the first lens L1 to the seventh lens L7 may be different, but shapes of the flange portions 300 thereof may be similar, and thus, hereinafter, the flange portion 300 of any one lens will be described for the convenience of description.

The flange portion 300 includes a first flange portion 310, a second flange portion 320, a third flange portion 330 and a fourth flange portion 340.

The first flange portion 310 extends from the first edge 110 of the optical portion 100, and the second flange portion 320 extends from the second edge 120 of the optical portion 100. For example, the first flange portion 310 extends from the first edge 110 of the optical portion 100 in the first axis (the X-axis) direction, and the second flange portion 320 extends from the second edge 120 of the optical portion 100 in the first axis (the X-axis) direction.

The first flange portion 310 and the second flange portion 320 may have surfaces facing in the first axis (the X-axis) direction.

The first flange portion 310 and the second flange portion 320 may contact and be coupled to the inner surface of the lens barrel.

The third flange portion 330 extends from the third edge 130 of the optical portion 100, and the fourth flange portion 340 extends from the fourth edge 140 of the optical portion 100. For example, the third flange portion 330 extends from the third edge 130 of the optical portion 100 in the second axis (the Y-axis) direction, and the fourth flange portion 340 extends from the fourth edge 140 of the optical portion 100 in the second axis (the Y-axis) direction.

The third flange portion 330 and the fourth flange portion 340 may have surfaces facing in the second axis (the Y-axis) direction.

The third flange portion 330 and the fourth flange portion 340 may be spaced apart from an inner surface of the lens barrel. That is, the third flange portion 330 and the fourth flange portion 340 do not contact the inner surface of the lens barrel.

The first edge 110 of the optical portion 100 may refer to a portion adjacent to the first flange portion 310, the second edge 120 of the optical portion 100 may refer to a portion adjacent to the second flange portion 320, the third edge 130 of the optical portion 100 may refer to a portion adjacent to the third flange portion 330, and the fourth edge 140 of the optical portion 100 may refer to a portion adjacent to the fourth flange portion 340.

When viewed in the optical axis (the Z-axis) direction, the first flange portion 310 and the second flange portion 320 may have an arc shape based on the optical axis (the Z-axis). The first flange portion 310 and the second flange portion 320 are disposed on opposite sides with respect to the optical axis (the Z-axis).

When viewed in the optical axis (the Z-axis) direction, the third flange portion 330 and the fourth flange portion 340 may have a long planar shape in the first axis (the X-axis) direction. The third flange portion 330 and the fourth flange portion 340 are disposed on opposite sides with respect to the optical axis (the Z-axis) and connect the first flange portion 310 and the second flange portion 320.

Figure 5:
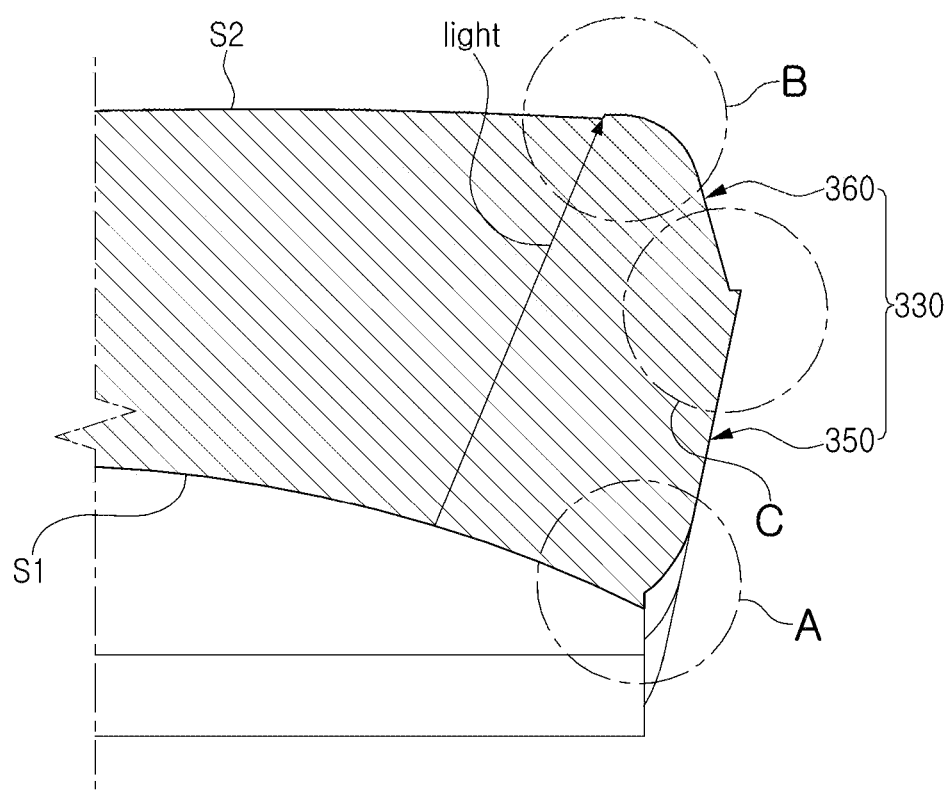
FIG. 5 is a view illustrating a portion of a cross-section taken along line I-I' of FIG. 2.
Figure 6:
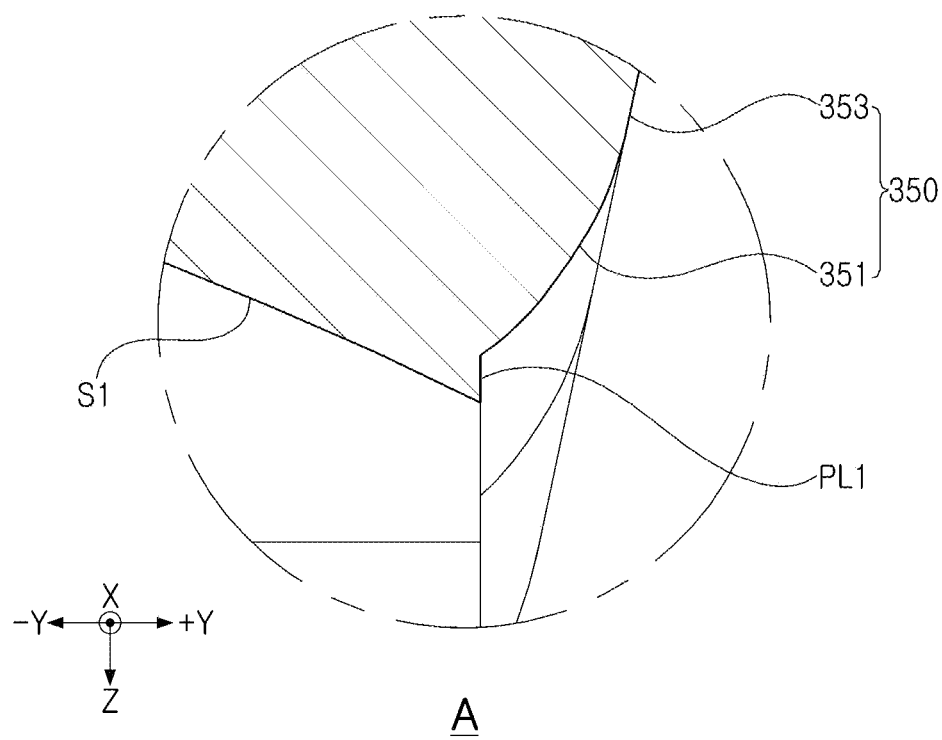
FIG. 6 is an enlarged view of portion A of FIG. 5.
Figure 7:
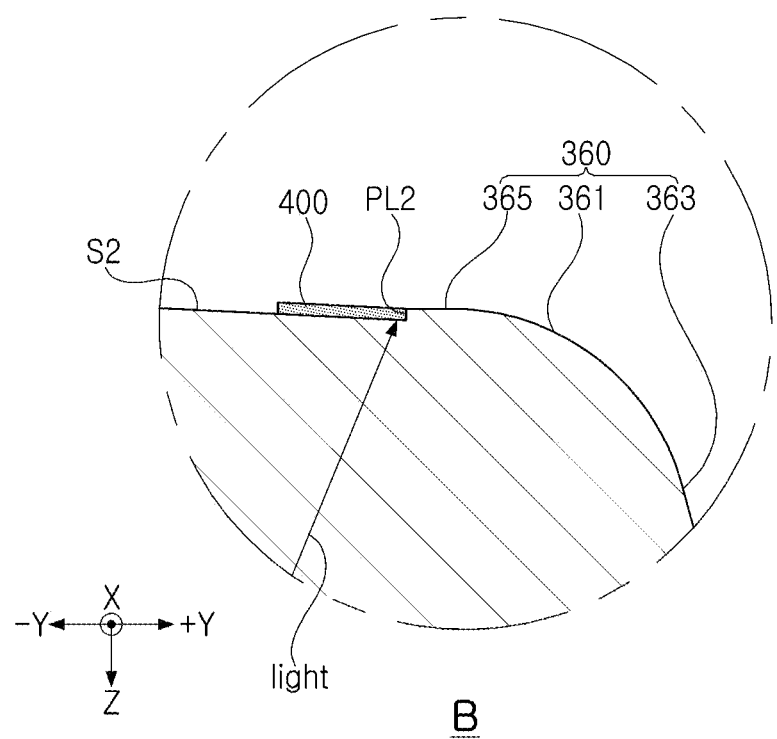
FIG. 7 is an enlarged view of portion B of FIG. 5.
Figure 8:
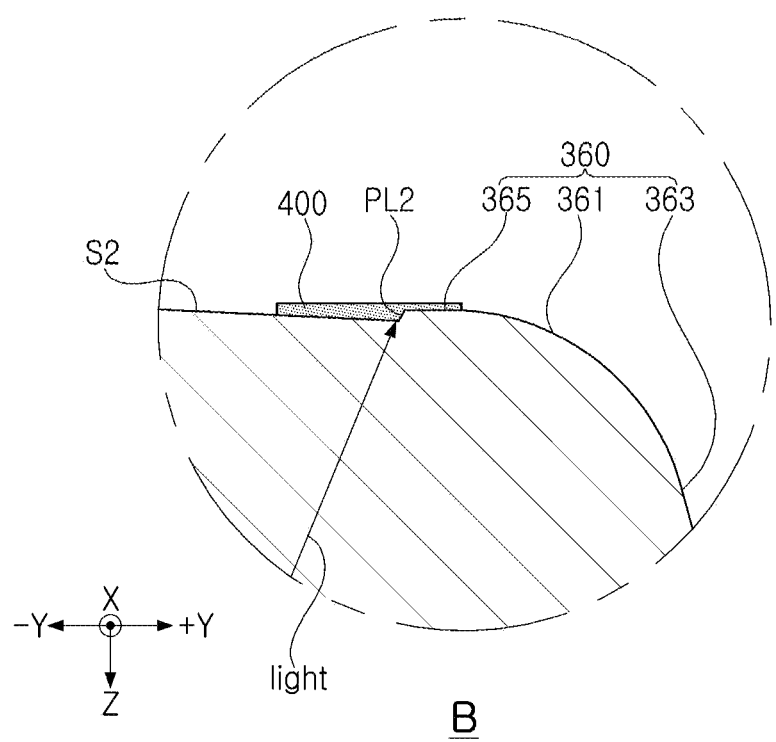
FIG. 8 is a modified example of FIG. 7.
Figure 9:
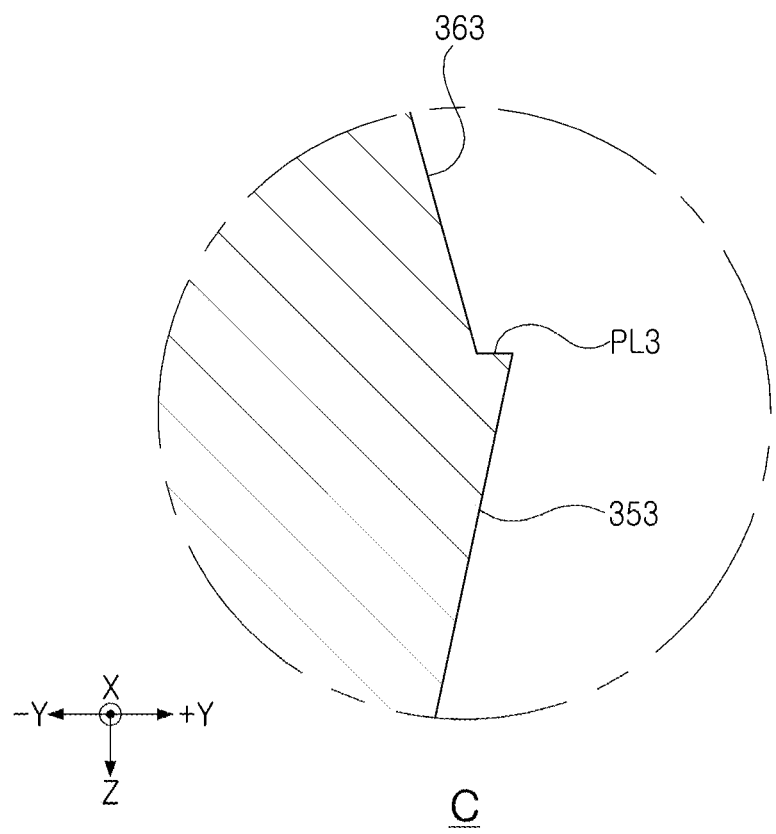
FIG. 9 is an enlarged view of portion C of FIG. 5.

FIG. 5 is a view illustrating a portion of a cross-section taken along line I-I' of FIG. 2, FIG. 6 is an enlarged view of portion A of FIG. 5, FIG. 7 is an enlarged view of portion B of FIG. 5, FIG. 8 is a modified example of FIG. 7, and FIG. 9 is an enlarged view of portion C of FIG. 5.

Referring to FIGS. 5 to 9, the third flange portion 330 and the fourth flange portion 340 respectively includes a first inclined portion 350 connected to a first surface S1 (e.g., the object-side surface) of the optical portion 100 and a second inclined portion 360 connected to a second surface S2 (e.g., the image-side surface) of the optical portion 100. The first inclined portion 350 and the second inclined portion 360 respectively include an inclined surface.

A first parting line PL1 may be formed in a portion in which the first inclined portion 350 is connected to the first surface S1 of the optical portion 100. For example, the first inclined portion 350 includes the first parting line PL1 formed in a portion connected to the first surface S1 of the optical portion 100.

The parting line may have a shape formed by surfaces of a plurality of molds in contact with each other during plastic injection.

The first inclined portion 350 may include a first curved portion 351 and a first flat portion 353. The first curved portion 351 may be connected to the first surface S1 of the optical portion 100 through the first parting line PL1, and the first flat portion 353 may extend from the first curved portion 351 and may be inclined with respect to the optical axis (the Z-axis). The first flat portion 353 may be inclined to be closer to the optical axis (the Z-axis) in a direction from the second surface S2 of the optical portion 100 toward the first surface S1.

The first parting line PL1 may be formed between the first curved portion 351 and the first surface S1 of the optical portion 100.

The first parting line PL1 may have a surface facing the second axis (the Y-axis) direction or an inclined surface with respect to the optical axis (the Z-axis).

For example, the edge of the first curved portion 351 may be spaced apart from the edge of the first surface S1 of the optical portion 100 (i.e., the third edge or fourth edge of the object-side surface in the optical axis (the Z-axis) direction, and the first parting line PL1 may be a surface connecting the edge of the first curved portion 351 to the edge of the first surface of the optical portion 100.

When viewed in the direction of the first axis (the X-axis), the first parting line PL1 may have a shape of a vertical plane or a plane inclined with respect to an optical axis (the Z-axis).

When the first parting line PL1 has a vertical plane, the vertical plane may be a plane facing in a positive direction of the second axis (the Y-axis).

When the first parting line PL1 has an inclined surface, the inclined surface may be closer to the optical axis (the Z-axis) in a direction from the second surface S2 of the optical portion 100 toward the first surface S1.

In a portion in which the second inclined portion 360 is connected to the second surface S2 of the optical portion 100, the second inclined portion 360 protrudes in the optical axis (the Z-axis) direction, relative to the second surface S2 of the optical portion 100.

A second parting line PL2 may be formed in a portion in which the second inclined portion 360 is connected to the second surface S2 of the optical portion 100. For example, the second inclined portion 360 includes the second parting line PL2 formed in a portion connected to the second surface S2 of the optical portion 100.

The second inclined portion 360 may include a second curved portion 361 and a second flat portion 363. The second curved portion 361 may be connected to the second surface S2 of the optical portion 100 through the second parting line PL2, and the second flat portion 363 may extend from the second curved portion 361 and may be inclined with respect to the optical axis (the Z-axis). The second flat portion 363 may be inclined to be closer to the optical axis (the Z-axis) in a direction from the first surface S1 of the optical portion 100 to the second surface S2.

In a portion in which the second curved portion 361 is connected to the second surface S2 of the optical portion 100, the second curved portion 361 may protrude, relative to the second surface S2 of the optical portion 100 in the optical axis (the Z-axis) direction.

The second parting line PL2 may be formed between the second curved portion 361 and the second surface S2 of the optical portion 100.

The second parting line PL2 may have a surface facing the second axis (the Y-axis) direction or an inclined surface with respect to the optical axis (the Z-axis).

The second inclined portion 360 may further include a third flat portion 365 disposed between the second curved portion 361 and the second surface S2 of the optical portion 100. In this case, the second parting line PL2 may be formed in a portion in which the third flat portion 365 is connected to the second surface S2 of the optical portion 100. In the portion in which the third flat portion 365 is connected to the second surface S2 of the optical portion 100, the third flat portion 365 may protrude in the optical axis (the Z-axis) direction, relative to the second surface S2 of the optical portion.

For example, the edge of the second curved portion 361 or the third flat portion 365 may be spaced apart from the edge of the second surface S2 of the optical portion 100 (i.e., the third edge or the fourth edge of the image-side surface) in the optical axis (the Z-axis) direction, and the second parting line PL2 may be a surface connecting the edge of the second curved portion 361 (or the third flat portion 365) to the edge of the second surface S2 of the optical portion 100.

When viewed in the direction of the first axis (the X-axis), the second parting line PL2 may have a shape of a vertical plane or a plane inclined with respect to the optical axis (the Z-axis).

When the second parting line PL2 has a vertical plane, the vertical plane may be a plane facing in a negative direction of the second axis (the Y-axis).

When the second parting line PL2 has an inclined surface, the inclined surface may be closer to the optical axis (the Z-axis) in a direction from the second surface S2 of the optical portion 100 toward the first surface S1.

A light absorption layer 400 may be disposed in a portion in which the second inclined portion 360 is connected to the second surface S2 of the optical portion 100. For example, the light absorption layer 400 may be disposed in the second parting line PL2.

In an example, the light absorption layer 400 may be disposed at the edge of the second surface S2 of the optical portion 100 and the second parting line PL2.

In an example, the light absorption layer 400 may be disposed to extend from the edge of the second surface S2 of the optical portion 100 to the second inclined portion 360. For example, the light absorption layer 400 may be disposed at the edge of the second surface S2 of the optical portion 100, the second parting line PL2, and the second curved portion 361 (or the third flat portion 365).

The light absorption layer 400 may be black, and may be formed by applying black ink.

When the third flat portion 365 is disposed between the second curved portion 361 and the second surface S2 of the optical portion 100, the amount of black ink flowing along the second inclined portion 360 may be reduced. Accordingly, the light absorption layer 400 in the second parting line PL2 may be formed to be thicker.

Light passing through the first surface S1 of the optical portion 100 and incident to the inside of the lens may be unintentionally reflected from the edge of the optical portion 100 (in particular, the second parting line PL2) to cause a flare phenomenon.

Thus, the light absorption layer 400 may be disposed in the second parting line PL2 to prevent a flare phenomenon caused by such diffuse reflection.

In this case, depending on a shape of the second parting line PL2, it may be difficult to apply the light absorption layer 400 to the second parting line PL2, and consequently, it may be difficult to suppress the flare phenomenon although the light absorption layer 400 is disposed in the second parting line PL2.

For example, when the second parting line PL2 has a shape having a surface facing in a positive direction of the second axis (the Y-axis) like the first parting line PL1 (in this case, the second surface S2 of the optical portion 100 protrudes in the optical direction (the Z-axis) direction, relative to the second curved portion 361), since light first passes through the second parting line before the light absorption layer on a light path, it may be difficult to suppress diffuse reflection occurring in the second parting line.

However, in the lens according to the various examples, since the second parting line PL2 is formed to have a surface facing in the negative direction of the second axis (the Y-axis) opposite to the first parting line PL1, light may first reach the light absorption layer before the second parting line, and accordingly, a flare phenomenon due to diffuse reflection of light may be suppressed.

A concavo-convex portion may be formed on each of the edge of the second surface S2 of the optical portion 100, the second parting line PL2, and the second curved portion 361 (or the third flat portion 365). That is, by roughening the surface roughness of the edge of the second surface S2 of the optical portion 100, the second parting line PL2, and the second curved portion 361 (or the third flat portion 365), light may be scattered, thereby further suppressing the flare phenomenon caused by diffuse reflection of light.

A third parting line PL3 may be formed in a portion in which the first flat portion 353 of the first inclined portion 350 and the second flat portion 363 of the second inclined portion 360 are connected to each other. The third parting line PL3 may have a surface facing the optical axis (the Z-axis) direction.

For example, when viewed in the direction of the first axis (the X-axis), the edge of the first flat portion 353 of the first inclined portion 350 may protrude in the second axis (the Y-axis) direction, relative to the edge of the second flat portion 363 of the second inclined portion 360 (and vice versa).

The third parting line PL3 may be a surface connecting the edge of the first flat portion 353 and the edge of the second flat portion 363 to each other.

The lens and the lens assembly including the lens according to the various examples may reduce the size and prevent the occurrence of flare.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens comprising:
    an optical portion configured to refract light; and
    a flange portion extending from the optical portion,
    wherein the optical portion has a greater length along a first axis direction than a second axis direction, the first axis direction and the second axis direction being perpendicular to an optical axis and perpendicular to each other,
    a flange portion extending along the first axis direction includes a first inclined portion connected to a first surface of the optical portion and a second inclined portion connected to a second surface of the optical portion,
    the second inclined portion protrudes in an optical axis direction, relative to the second surface of the optical portion, in an area in which the second inclined portion is connected to the second surface of the optical portion, and
    a light absorption layer is disposed in the area in which the second inclined portion is connected to the second surface of the optical portion.

2. The lens of claim 1, wherein the first surface of the optical portion is an object-side surface, and the second surface of the optical portion is an image-side surface.

3. The lens of claim 1, wherein the light absorption layer extends from an edge of the second surface of the optical portion to the second inclined portion.

4. The lens of claim 1, wherein the light absorption layer is black.

5. The lens of claim 1, wherein
    the first inclined portion includes a first curved portion adjacent to the first surface of the optical portion and a first flat portion extending from the first curved portion and inclined with respect to the optical axis, and
    a first parting line is formed between the first curved portion and the first surface of the optical portion.

6. The lens of claim 5, wherein the first parting line has a surface facing the second axis direction or an inclined surface with respect to the optical axis.

7. The lens of claim 1, wherein
    the second inclined portion includes a second curved portion adjacent to the second surface of the optical portion and a second flat portion extending from the second curved portion and inclined with respect to the optical axis, and
    a second parting line is formed between the second curved portion and the second surface of the optical portion.

8. The lens of claim 7, wherein the second parting line has a surface facing the second axis direction or an inclined surface with respect to the optical axis.

9. The lens of claim 7, wherein the second inclined portion includes a third flat portion disposed between the second curved portion and the second surface of the optical portion.

10. The lens of claim 7, wherein the light absorption layer is disposed at an edge of the second surface of the optical portion, the second parting line, and the second curved portion.

11. The lens of claim 7, wherein a concavo-convex portion is disposed at each of an edge of the second surface of the optical portion, the second parting line, and the second curved portion.

12. The lens of claim 1, wherein
    the first inclined portion includes a first flat portion inclined with respect to the optical axis, the second inclined portion includes a second flat portion inclined with respect to the optical axis, and
    a third parting line is formed in an area in which the first flat portion and the second flat portion are connected to each other.

13. The lens of claim 12, wherein the third parting line has a surface facing the optical axis direction.

14. A lens assembly comprising:
    a lens including an optical portion configured to refract light and a flange portion extending from the optical portion, wherein the lens has a greater length along a first axis direction that a second axis direction, the first axis direction and the second axis direction being perpendicular to an optical axis and perpendicular to each other; and
    a lens barrel accommodating the lens,
    wherein the flange portion includes a first flange portion and a second flange portion facing each other in the first axis direction and a third flange portion and a fourth flange portion facing each other in the second axis direction,
    the first flange portion and the second flange portion are in contact with and coupled to the lens barrel,
    the third flange portion and the fourth flange portion are spaced apart from the lens barrel,
    the third flange portion and the fourth flange portion each include a first inclined portion connected to an object-side surface of the optical portion and a second inclined portion connected to an image-side surface of the optical portion,
    a parting line is disposed in an area in which the image-side surface of the optical portion is connected to the second inclined portion and protrudes in an optical axis direction, relative to the image-side surface of the optical portion, and
    a light absorption layer is disposed in the parting line.

15. The lens assembly of claim 14, wherein a second parting line having a surface facing the second axis direction is disposed in an area in which the object-side surface of the optical portion is connected to the first inclined portion.

16. The lens assembly of claim 14, wherein a second parting line having a surface facing the optical axis direction is disposed in an area in which the first inclined portion is connected to the second inclined portion.

* * * * *